United States Patent [19]

Retz

[11] Patent Number: 4,671,518
[45] Date of Patent: Jun. 9, 1987

[54] INFLATABLE REACTOR VESSEL STUD HOLE PLUG

[75] Inventor: Alexander J. Retz, Toledo, Spain

[73] Assignee: Westinghouse Electric Corp., Pittsburgh, Pa.

[21] Appl. No.: 689,544

[22] Filed: Jan. 7, 1985

[51] Int. Cl.⁴ .................... B65D 53/00; F16J 15/46; G21C 13/06

[52] U.S. Cl. ........................ 277/1; 137/225; 138/93; 220/239; 277/9; 277/34; 376/203; 411/19; 411/34; 411/371

[58] Field of Search .................. 277/1, 34.3, 34.6, 12, 277/9; 220/239, 234; 138/93; 376/203, 205; 411/19, 20, 34, 371, 372, 373; 137/223, 231, 233, 234.5, 225, 227

[56] References Cited

U.S. PATENT DOCUMENTS

| 1,683,336 | 9/1928 | Cummings | 138/93 |
| 2,843,154 | 7/1958 | Hoskins | 138/93 |
| 3,130,583 | 4/1964 | Greue et al. | 220/234 X |
| 3,606,070 | 9/1971 | Shepherd | 220/234 X |
| 3,794,204 | 2/1974 | Wehmeyer | 220/235 |
| 3,870,085 | 3/1975 | Schneider | 138/93 |

FOREIGN PATENT DOCUMENTS

| 9991 | 7/1902 | Austria | 138/93 |
| 7030 | of 1895 | United Kingdom | 138/93 |

Primary Examiner—Allan N. Shoap
Attorney, Agent, or Firm—Daniel C. Abeles

[57] ABSTRACT

An expandable inflatable circular plug for sealing one of the blind bore holes which are located in a reactor vessel body flange of a nuclear reactor and which are used to fasten the reactor vessel head to the reactor vessel body by means of bolts passing through corresponding bores in a mating flange on the reactor vessel head. The plug comprises: a cylindrical member of an elastomer material disposed substantially symmetrically between first and second circular metal plates and sealingly fastened thereto so as to define a radially expandable pressure chamber within the cylindrical member; an axial bore extending from the outer surface of the first plate and opening into the annular pressure chamber; a normally closed valve disposed in the axial bore for sealing the axial bore when in its closed position and for permitting air to enter or leave the chamber via the axial bore when in its open position; and an arrangement disposed adjacent the outer surface of the first plate member for releaseably coupling the plug to a tool which is used to insert the plug into a hole to be sealed and to open the valve to supply pressurized air to the chamber to inflate and expand same. A tool and a method of inserting and removing the plug using the tool are also disclosed.

15 Claims, 5 Drawing Figures

INFLATABLE REACTOR VESSEL STUD HOLE PLUG

BACKGROUND OF THE INVENTION

The present invention relates to an inflatable plug for sealing the stud holes in a nuclear reactor vessel. More specifically, the present invention relates to an inflatable plug for sealing the blind bore holes located in the reactor vessel flange of a nuclear reactor, which bore holes are normally used to fasten the reactor vessel head to the reactor vessel by means of bolts or studs passing through corresponding bores in a flange of the reactor vessel head, during refueling operations for the nuclear reactor. The present invention also relates to a method of inserting the plugs into the bores or stud holes.

The refueling of pressurized water nuclear reactors is, in general, a routine operation carried out with a high degree of reliability. For normal load requirements, refueling is provided on approximately yearly intervels, with the complete refueling operation normally taking approximately three to four weeks.

In most commercial plants, the reactor vessel is positioned within a concrete cavity in the containment arrangement, with the cavity having an upper portion above the vessel which defines the refueling chamber or refueling canal. This refueling chamber or canal is maintained dry during normal reactor operation. However, during the refueling of the reactor, the refueling chamber or canal is filled with water, with the water level being sufficiently high to provide adequate shielding so as to maintain the radiation levels within accepted limits when, after removal of the reactor vessel head or top, the fuel assemblies are removed completely from the reactor vessel. The height of such flooding water in the refueling chamber or canal is, for example 7 to 8.5 meters, and an additive, for example boric acid, is generally added to the water in order to ensure subcritical conditions during refueling.

As indicated above, in order to remove the fuel assemblies from the reactor vessel, it is initially necessary to remove the head or top of the reactor vessel. This head or top of the reactor vessel is conventionally fastened to the reactor vessel itself by means of a plurality of head bolts or studs which extend vertically down through bores in a outwardly extending annular flange on the head or top, and threadingly engage in correspondingly located blind bores in an outwardly extending substantially horizontal flange on the reactor vessel itself. In a typical pressurized water type nuclear reactor, approximately 58 such bolts are utilized, with each bolt, depending on the size of the reactor, having a diameter of 15 to 18 centimeters and a length in the order of 76 to 92 centimeters. The bolts or studs are all removed prior to flooding of the refueling chamber or canal. The head or top, however, is removed only after flooding with water.

In order to protect the threads of the stud or bolt holes or bores in the reactor vessel flange from corrosion, for example from the constituents of the water used to flood the reactor vessel chamber or canal, and from other possible damage during the refueling operation, it is customary to plug these blind bore holes prior to flooding of the refueling cavity or canal and the subsequent removal of the reactor vessel head or top. Presently, these stud or bolt holes are plugged by means of threaded plugs which are manually threaded into the individual stud holes. Such threaded plugs are not only difficult and time consuming to install, as well as to subsequently remove following the refueling operation, but moreover do not reliably provide a water tight seal for the stud holes. This difficulty in providing a reliable water tight seal is due primarily to surface irregularities in the area of the counter bore of the stud holes. As is clear, the absence of such a water tight seal can result in the undesired corrosion of the threads, resulting in considerable additional difficulty in removing the plugs, as well as in subsequently sealing the reactor vessel itself following the refueling operation.

SUMMARY OF THE INVENTION

It is therefore an object of the present invention to provide an improved plug which can be used to reliably seal the blind stud holes in the reactor vessel flange during the flooding of the reactor refueling chamber or canal, and which is simplier to install and remove than the presently existing threaded plugs.

It is a further object of this invention to provide a method and apparatus whereby the stud holes in the reactor vessel flange may be more easily and quickly sealed prior to flooding of the nuclear reactor than is possible with the presently available threaded plugs.

The above objects are achieved according to the present invention by an expandable inflatable circular plug for sealing one of the blind bore holes which are located in a reactor vessel body flange of a nuclear reactor and which are used to fasten the reactor vessel head to the reactor vessel body by means of bolts passing through corresponding bores in a mating flange on the reactor vessel head, which plug comprises: first and second spaced substantially parallel circular metal plate members, with the first plate member having a diameter slightly smaller than that of the hole to be plugged, and with the second plate member having a diameter which is at least as large as that of the first plate member and a rod-shaped extension which extends axially from the surface of the second plate member facing the first plate member to the first plate member; a cylindrical member disposed substantially symmetrically between the first and second plate members, with the cylindrical member being formed of an elastomer material and having a diameter which is normally substantially the same as that of the first plate member; means for sealingly fastening the first and second plate members and the cylindrical member together so as to define a radially expandable annular pressure chamber within the cylindrical member; an axial bore extending from the outer surface of the second plate member at least partially through the rod-shaped extension; at least one transverse bore disposed in the rod-shaped extension and opening into both the axial bore and the annular pressure chamber; a normally closed valve means, which is disposed in the axial bore between the outer surface of the second plate member and the at least one transverse bore and which is opened in response to an axial force in the direction toward the transverse bore, for sealing the axial bore when in its closed position and for permitting air to enter or leave the chamber via the transverse and axial bores when in its open position; and means disposed adjacent the outer surface of the second plate member for releasably coupling the second plate member, and hence the plug, to a tool which is used to insert the plug into a hole to be sealed and to open the valve to supply pressurized air to the chamber to inflate and expand same.

According to a further feature of the invention, the diameter of the second plate member is larger than that of the first plate member and is sufficiently large so as to cover the hole to be plugged, and the portion of the peripheral surface of the cylindrical member adjacent the second plate member has a slight outward taper whereby an additional sealing effect is achieved when the reactor cavity is flooded.

The above objects are achieved according to a further aspect of the invention by a method of sealing one of the blind bores located in the reactor vessel body flange of a nuclear reactor, and which normally are used to fasten the reactor vessel head to the reactor vessel body by means of bolts passing through corresponding bores in a mating flange on the reactor vessel head, prior to the flooding of the reactor vessel and subsequent removal of the reactor vessel head for the purpose of refueling the reactor, which method comprises the steps of: providing an elongated insertion tool of a length sufficient to extend through a bore hole in the flange of the reactor vessel head and into the underlying blind bore; releasably attaching an expandable inflatable circular plug of the type described above to one end of the insertion tool; by means of the insertion tool, passing the plug through a bore hole in the vessel head flange and positioning the plug in the upper portion of the underlying blind bore hole; opening the valve means in the plug by means of the tool; passing air under pressure through the tool and into the chamber of the plug to expand the wall of the cylindrical member until it sealingly contacts the adjacent wall of the blind bore; and thereafter, closing the valve means, releasing the plug from the tool, and withdrawing the tool from the bore hole in the flange of the vessel head.

DETAILED DESCRIPTION OF THE PREFERRED EMBODIMENTS

Figure 1:
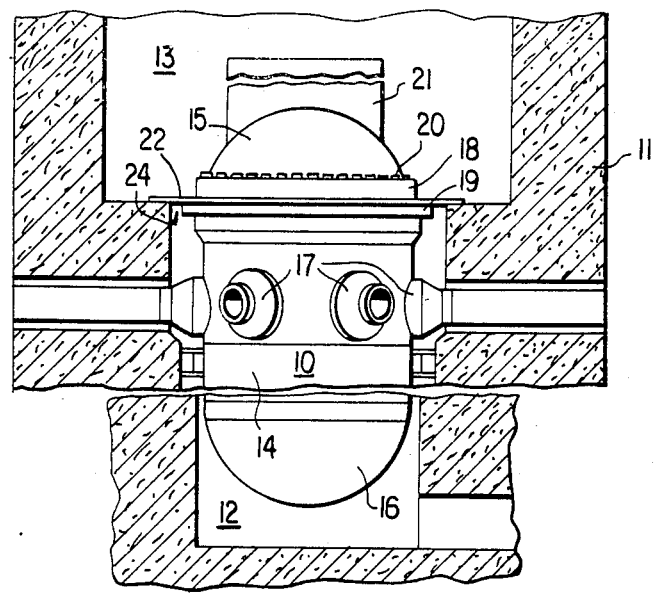
FIG. 1 is a side view, partially is section, of a reactor vessel disposed in a reactor cavity.

Referring now to FIG. 1, there is shown a nuclear reactor vessel 10 which is disposed in a generally circular reactor cavity essentially formed by a concrete wall 11. The reactor cavity is divided into a lower portion 12, which surrounds the vessel structure itself, and an upper portion 13 which is commonly utilized and referred to as a refueling chamber or canal. As shown, the reactor vessel 10 is spaced from the concrete wall 11 defining the reactor cavity so as to provide for expansion of the reactor vessel 10 during operation as well as to permit air circulation around the reactor vessel.

The illustrated reactor is of the pressurized liquid type wherein the pressure vessel 10 has a generally cylindrical body 14, a generally hemispherical upper head or end 15 and a generally hemispherical lower end 16. The cylindrical body 14 is provided with a plurality of nozzles 17 for the connection of the piping for the primary loops for the reactor power system. The upper end 15 of the reactor vessel 10 is provided with a laterally extending bolting flange 18 which is bolted to a flange 19 on the cylindrical body 14 of the reactor vessel by means of a plurality of head bolts 20 which extend through the flange 18 and are threadingly engaged in blind bores or stud holes in the flange 19. A control rod drive mechanism housing 21 is disposed on top of the upper head or end 15 of the reactor vessel.

As discussed above, during refueling of the reactor, the upper cavity portion for refueling canal 13 is flooded with water. To prevent the flooding water from entering the lower cavity portion or well 12, and damage instrumentation and the like for the reactor contained therein, a flat annular sealing ring 22 is providing during the refueling operation and positioned to seal the annular gap 24 between the flange 19 and the concrete wall 11. Moreover, as further discussed above, prior to flooding of the upper cavity portion or refueling canal 13, the head bolts 20 are removed and the threaded blind bores or stud holes 25 (FIG. 2) in the reactor vessel body flange 19 are sealed by means of plugs inserted via the through bores 26 (FIG. 2) in the flange 18 of the upper head 15. In a typical reactor vessel the thickness of the flange 18, and consequently the length of the bores 26 may be in the order of sixty-eight to seventy-six centimeters. As further shown in FIG. 2, the bores 26 have a slightly larger diameter than the bores 25 which in turn have an unthreaded upper or counterbore portion 27 with a slight outwardly tapering portion 28 adjacent the surface 29 of the reactor body flange 19.

Figure 2:
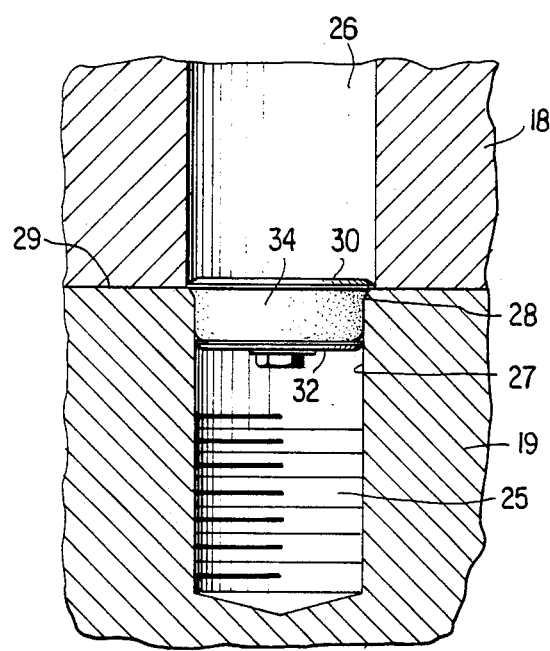
FIG. 2 is a side view, partially in section, showing a plug according to the invention installed in a blind bore or stud hole of the reactor vessel flange prior to removal of the head or top of the reactor vessel.

As is also shown in FIG. 2, the plug according to the invention used to seal the blind bores 25 is an inflatable plug which generally includes two spaced circular metal plate members 30 and 32, which are internally fastened together, and a generally cylindrical member 34 which is formed of an expandable elastomer material which sealingly engages the side wall of the portion 27 of the bore 25 and which is clamped between the metal members 30 and 32. The metal member 32, as well as the expandable cylindrical member 34 have a diameter such that they can fit into the portion 27 of the bore 25, while the member 30 has a diameter which preferably is sufficiently larger than that of the member 32 so as to cover the bore 25, but is sufficiently small so that can fit through the bore 26 in the head flange 18.

Figure 3:
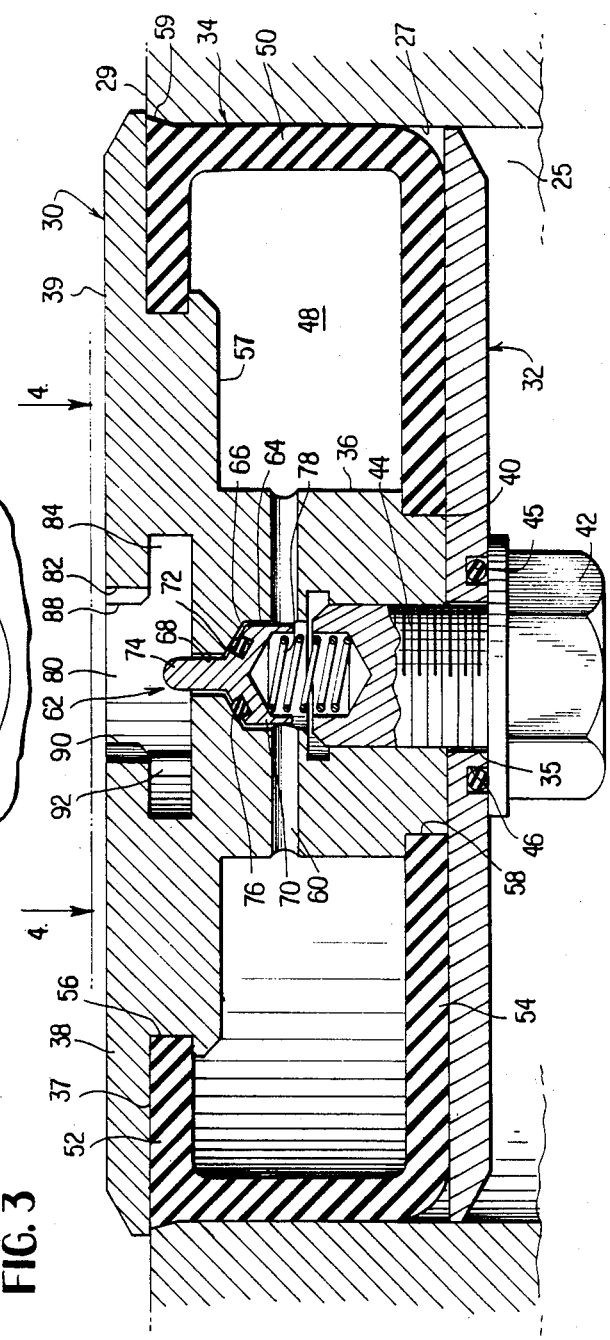
FIG. 3 is a longitudinal sectional view of a preferred embodiment of an inflatable plug according to the invention.

Turning now to FIG. 3, there is shown a preferred embodiment of an inflatable plug according to the invention. As shown in FIG. 3, the member 32 is essentially a flat plate having a central opening 35. The plate member 30 on the other hand, is provided with a rod-shaped extension 36 which extends axially from the inner surface 37 of the plate like portion 38 of the member 30, and has a length which corresponds substantially to the height of the cylindrical member 34. The end surface 40 of the rod-shaped extension 36 abuts against the inner surface of the member 32, and the members 30 and 32 are fastened together by means of a bolt 42 which extends through the opening 35 in the member 32 and is engaged in a threaded portion 44 of an axial bore extending completely through the member 30. To ensure a proper seal, a compressable O-ring seal 45 is disposed in an annular groove 46 which is provided in the outer surface of the member 32 and positioned so that the seal 45 will be compressed by the head of the bolt 42 when it is tight.

The cylindrical member 34 of the elastomer material is, as shown, symmetrically disposed between the two plate members 30 and 32 and is sealingly fastened or clamped between same so as to define an annular expandable pressure chamber 48. To sealingly clamp the cylindrical member 34 between the plates 30 and 32, the cylindrical wall portion 50 of the member 34 is provided with inwardly directed top and bottom portions 52 and 54 which are each provided with a circular central opening and which respectively extend along the inner surface 37 of the plate like portion 38 of member 30 and the inner surface of the member 32. The inner end of top portion 52 is held in a peripheral groove 56 provided in an annular collar 57 of the extension 36. The inner end of the bottom member 54, on the other hand, is held in a groove 58 formed in the periphery of the extension 36 adjacent its end surface 40, whereby the inner end of member 54 will be positively clamped between the member 36 and the inner surface of member 32 when the members 30 and 32 are fastened together by means of the bolt 42. Preferably, as shown, the outer peripheral surface of the cylindrical member 34 is provided with a short outwardly tapering portion 59 adjacent the inner surface 37 of member 32. This tapered portion 59 will provide an additional sealing effect when the refueling canal 13 is flooded in that the weight of the water against the outer surface 39 of the member 30 will tend to force portion 59 against tapered portion 28 of the bore 25.

To provide for pressure communication to the annular chamber 48, at least one transversely extending bore 60, which opens into both the chamber 48 and the axial bore in the member 32 is provided in the rod-shaped extension 36. Moreover, in order to be able to seal the axial bore, and thus maintain a desired pressure within the chamber 48, a normally closed valve arrangement is provided in the axial bore of the member 30 between the location of the transverse bore 60 and the outer surface 39 of the member 30. As shown, the valve arrangement generally comprises a valve plunger 62 which is disposed in the axial bore of the member 30 so that it is axially moveable in the axial bore and has a shape which cooperates with the shape of the side wall of the axial bore to provide a valve arrangement. More specifically the portion of the axial bore containing the plunger 62 has a first section 64 adjacent the transverse bore 60 which is of constant diameter and which is then followed, in a direction toward the outer surface 39 of the member 30, by an inwardly tapering section 66 and a section 68 of a reduced constant diameter.

The plunger 62, in turn, has a first portion 70 with a peripheral surface of constant diameter disposed in the bore section 64, a portion with an inclined or tapered surface 72 facing the tapered side wall of the bore in the tapered bore section 66, and finally an actuator portion 74 of reduced constant diameter disposed in the axial bore section 68. To provide the actual sealing function between the plunger 62 and the side wall of the axial bore in the tapered bore section 66, an O-ring seal 76 is provided in a groove disposed in the inclined surface 72 of the plunger 62. Since, as indicated above, the valve arrangement is normally to be maintained in a closed position, a compressed spring 78 is provided between the inner end surface of the plunger 62 and the facing inner end surface of the bolt 42 so as to urge the plunger 62 toward the outer surface 39 of the member 30 and compress the O-ring seal 76 against the inclined side wall of the bore section 66. Preferably, as shown, the ends of the spring 78 are seated in respective blind bores formed in the facing end surfaces of the plunger 62 and the bolt 42 so as to maintain the axial position of the spring 78 and the plunger 62.

As further shown in FIG. 3, the end of the actuator section 74 of the plunger 62 terminates beneath the outer surface 39 of the member 30 in an enlarged portion 80 of the axial bore through the member 30 with the portion 80 being provided for the insertion of the tool used to insert and remove the plug. By terminating the actuator section 74 of the plunger 62 beneath the surface 39, accidental depression of the plunger 62 and opening of the valve arrangement after the flooding of the reactor and removal of the reactor vessel head is prevented.

Figure 4:
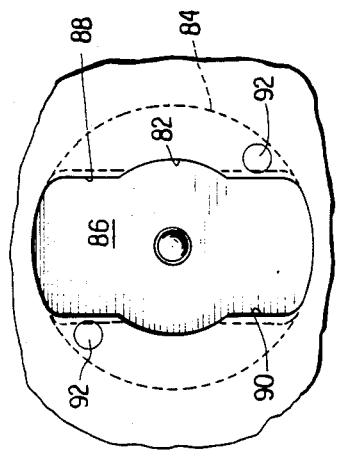
FIG. 4 is a partial plan view of an inflatable plug according to the invention taken in the direction of the lines 4—4 of FIG. 3.

In order to releasably attach the plug to the end of an insertion tool for inserting and removing the plug from the blind bolt 25, the enlarged portion 80 of the axial bore in the member 30 is shaped so that it constitutes the female member of a twist locking bayonet type coupling arrangement. For this purpose, as shown in FIGS. 3 and 4, the enlarged portion 80 of the axial bore in the member 30 is provided with a first circular section 82 adjacent the outer surface 39 of a diameter corresponding to that of an insertion tool, and a following section 84 of a substantially increased diameter which entends radially beneath and parallel to the surface 39. Additionally, an elongated slot 86 is formed in the surface 39 of the member 30 so that it extends transversely through the bore section 82 and downwardly into the member 30 to the enlarged bore section 84. As shown, the opposed sides 88, 90 of the slot 86 are defined by parallel chords of both the circle defining the periphery of the enlarged section 84 and the circle defining the periphery of the section 82 of the axial bore. With this arrangement, upon insertion of the end of an insertion tool having a laterally extending flange of a shape corresponding to the slot 86 into the opening 80, and rotating same so that the shaped lateral flange is disposed in the covered portion of the bore section 84, the plug will be releasably coupled to the insertion tool. To limit possible rotation of the insertion tool to less than 180°, whereby the flange on the insertion tool would agian be aligned with the slot 86, a pair of diametrically opposed pins or stops 92 for the flange on the insertion tool are provided in section 84. As shown these pins 92 extend from the surface 39 to the bottom of the portion 84 and are disposed adjacent the respective edges 88 and 90 whereby they simultaneously serve to align the slot 86 with the lateral flange on the end of the insertion tool in order to permit uncoupling of the insertion tool after proper placement and inflation of the plug to seal a bore 25. As a result of the placement of the pins 92 as shown in FIGS. 3 and 4, rotation of the tool to the right is necessary to couple the plug to the end of the tool, while rotation to the left is utilized for release or uncoupling purposes.

The metal parts of the plug according to the invention are preferably formed of stainless steel so as to make decontamination easy if necessary. The elastomeric portion 34, as well as the seals 45 and 76 are preferably formed of a known ethylene-propylene diene monomer (EPDM).

Figure 5:
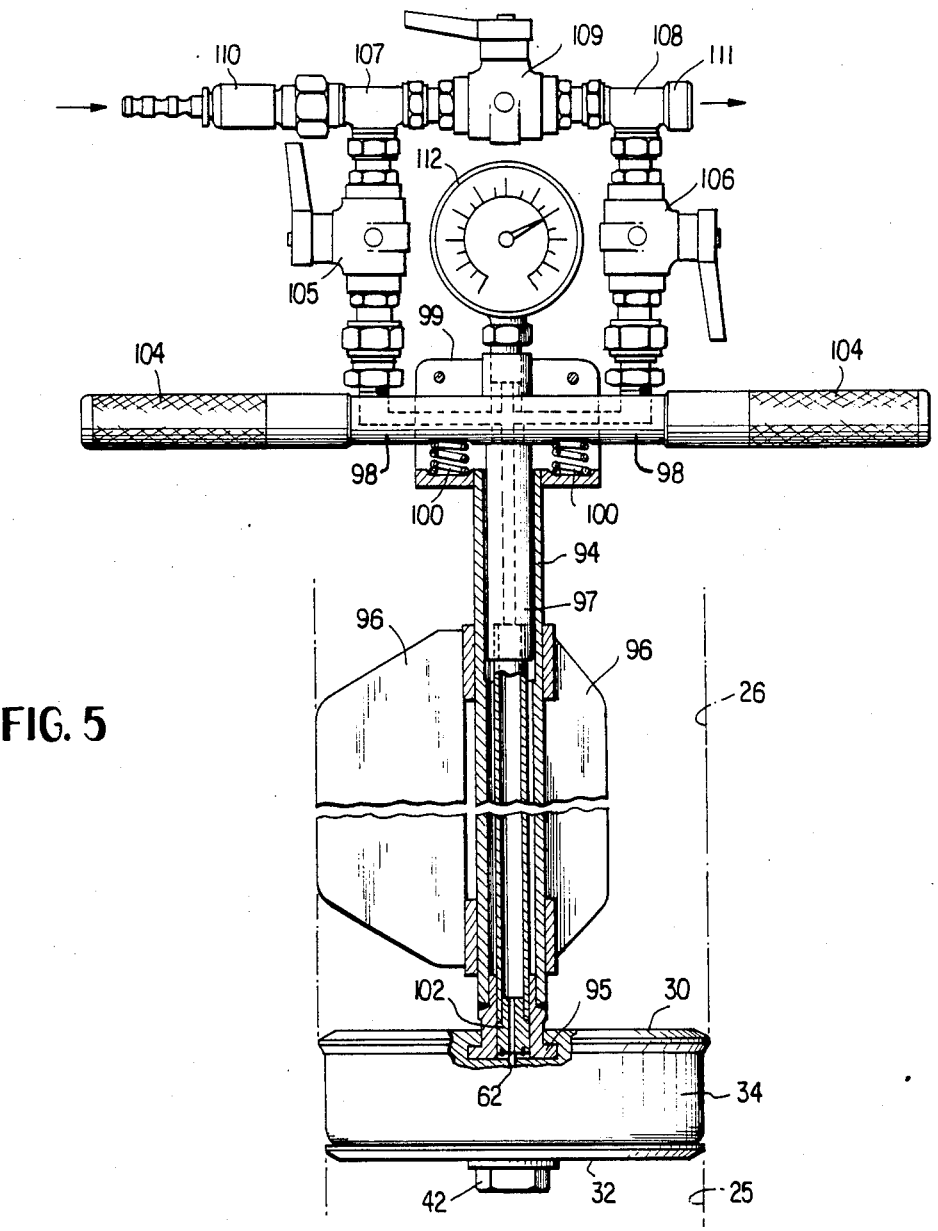
FIG. 5 is a side view, partially in section, illustrating a tool according to the invention for inserting an inflatable plug into the blind bore hole of the reactor vessel flange.

Turning now to FIG. 5, there is shown a preferred embodiment of a tool for insertion and removal of a plug according to the invention. As shown, the insertion tool includes a tubular member 94 of a length sufficient to pass completely through the bore 26. At is lower end, the tubular member 94 is provided with a laterally extending flange 95 of the shape and size of the slot 86 (FIG. 4) so that an inflatable plug according to the invention can be releasably fastened to the end of the tubular member 94. Along its length, the tubular member 94 is provided with a plurality of radially outwardly extending fins 96 which are symmetrically disposed about the circumference of the member 94 for the purpose of centering the insertion tool in the bore 26 so as to facilitate insertion and removal of a plug. A T-shaped tubular member 97 is disposed within the tubular member 94 and extends along the entire length thereof. The tubular member 97 is mounted so that it is axially displaceable in the tubular member 94, and has its arms 98 mounted for limited axial movement in a support 99 connected to the upper end of the tubular member 94. The support 99 is provided with springs 100 which engage the arms 98 of the member 97 so as to urge same in a direction away from the flange 95. The lower end of the inner T-shaped tubular member 97 is provided by a perforated end plug 102 which, when the T-shaped tubular member 97 is depressed, will depress the plunger 62 to open the valve arrangement and permit air to pass via the interior of the member 97 to the chamber 48 of the plug. The arms 98 of the T-shaped member 97 are provided with handles 104 so as to facilitate handling of the tool and to provide the necessary force against the springs 100 for depressing the tubular member 97.

To control the flow of air into and out of the plug via the tubular member 97 of the insertion tool, each of the arms 98 of the tubular member 94 is connected to one end of a normally closed valve 105 or 106. The other end of each of the valves 105 or 106 is provided with a respective T-coupling 107 or 108 and a further normally closed valve 109 is connected between the couplings 107, 108. Air under pressure is supplied to the tool via a coupling 110 connected to the remaining end of the T-shaped coupling 107, while air can leave the tool by the open end 111 of T-coupling 108. Finally, in order to be able to determine the pressure within the plug attached to the end of the tool, a pressure gauge 112 is provided, with this pressure valve being connected to the T-shaped tubular member 97 for movement therewith.

To insert a plug according to the invention as shown in FIG. 3 into the bore hole 25 by means of a tool shown in FIG. 5 according to the method of the invention, a plug such as shown in FIG. 3 is initially attached to the end of the tool by inserting the flange 95 into the slot 86 and then rotating the plug relative to the tool so as to releasably connect the plug to the tool. Thereafter, the plug and the tool are inserted into the bore 26 and, by means of the tool, lowered through the bore 26 of the flange 18 until the plug is located in the counterbore portion 27 of the blind bore 25 in the bottom flange 19, with the tapered portion 59 of the cylindrical member 34 resting on the tapered portion 38. Thereafter, downward pressure is exerted on the handles 104 of the tool so as to cause the tubular member 97 to move downwardly relative to the member 94 and engage and depress the plunger 62 and open the valve arrangement in the inflatable plug. At that time, by opening the valve 105, air under pressure supplied at coupling 110 is caused to pass via the valve 105 and the tubular member 97 into the axial bore of the plug member 30 and through the transverse bore 60 into the chamber 48 so as to expand same until the outer periphery of member 34 contacts the side wall of the bore 25 to seal same. Upon an indication of a desired pressure on the gauge 112 indicating a desired degree of seal, the valve 105 is closed and the downward pressure on the tool is removed so as to allow the plunger 62 to move upwardly and seal the axial bore and thus the chamber 48 of the plug. Thereafter, by means of the handles 104, the tool is rotated so as to align the flange 95 of the tool with the slot 86, whereupon the tool is removed from the bore 26 in the head flange 18, while permitting the plug to stay in place.

In order to remove a plug according to the invention after refueling the reactor and repositioning of the reactor vessel head 15, the tool as shown in FIG. 5 is reinserted into the bore hole 26 of the head flange 18 and lowered until the lower end of the tubular member 94 contacts the upper surface 39 of the member 30 of the plug. Thereafter, the tool is rotated by means of the handles 104 until the flange 95 is aligned with and enters the slot 86, whereupon the tool is further rotated to couple the tool to the plug. Thereafter, a downward force is applied to the handles 104 so as to cause the plunger 62 to be moved downwardly and open the valve arrangement in the plug, and the valve 106 is opened, whereby the pressurized air in the chamber 48 can escape via the tubular member 97, the valve 106 and finally out of the outlet opening 111 of the T-coupling 108. Following release of the pressure in the chamber 48, with the consequent deflection and retraction of the outer periphery of the member 34 from sealing contact with the side wall of the bore 25, the tool with the plug attached to the bottom end thereof can be retracted from the bore hole 26. In the event sticking occurs between the peripheral surface of the member 24 and the side wall of the bore hole, which sticking is sufficient to prevent easy removal of the plug from the bore hole, the valve 109 may be opened to cause air under pressure to pass directly past the open valve 108 and out of the exit opening 111. This will produce a partial vacuum in the air chamber 48, causing the member 34 to be positively collapsed toward the interior of the plug, and thus guarantee easy removal of the plug from the bore.

In summary, the pesent invention provides an inflatable reactor vessel stud hole plug by means of which is possible to obtain a leak tight seal, even in case of an irregular stud hole plug counterbore surface, and which provides for a low profile which precludes any potential for interference with the various operations required during the refueling of the reactor vessel. Moreover, the insertion and removal of the plugs according to the invention results in a considerable saving in the time required for the respective operations, which not only decreases the costs involved, but moreover provides a reduction in the radiation exposure to the personnel involved. For example, the installation or removal time for fifty-eight plugs according to the invention with the insertion tool disclosed takes about 20 minutes for the full set of plugs, which is considerably shorter than the time required for these operations with the conventional threaded plugs.

It will be understood that the above description of the present invention is susceptible to various modifications, changes and adaptations, and the same are intended to be comprehended within the meaning and range of equivalents of the appended claims.

What is claimed is:

1. An expandable inflatable circular plug for sealing one of the blind bore holes which are located in a reactor vessel body flange of a nuclear reactor and which are used to fasten the reactor vessel head to the reactor vessel body by means of bolts passing through corresponding bores in a mating flange on the reactor vessel head, said plug comprising in combination:

first and second spaced substantially parallel circular metal plate members, said first plate member having a diameter slightly smaller than that of the hole to be plugged, and said second plate member having a diameter which is at least as large as that of said first plate member and having a rod-shaped extension which extends axially from the surface of said second plate member facing said first plate member to said first plate member;

a cylindrical member disposed substantially symmetrically between said first and second plate members, said cylindrical member being formed of an elastomer material and having a diameter which is normally substantially the same as that of said first plate member;

means for sealingly fastening said first and second plate members and said cylindrical member together so as to define a radially expandable annular pressure chamber within said cylindrical member;

an axial bore extending from the outer surface of said second plate member at least partially through said rod-shaped extension;

at least one transverse bore disposed in said rod-shaped extension and opening into both said axial bore and said annular pressure chamber;

a normally closed valve means, disposed in said axial bore between said outer surface of said second plate member and said at least one transverse bore, for sealing said axial bore when in a closed position and for permitting air to enter or leave said chamber via said transverse and axial bores when in an open position, said valve means being opened in response to an axial force in the direction toward said transverse bore; and means disposed adjacent said outer surface of said second plate member for releasably coupling said second plate member, and hence said plug, to a tool used to insert said plug into a hole to be sealed and to open said valve to supply pressurized air to said chamber to inflate and expand same.

2. A plug as defined in claim 1 wherein: said axial bore extends through said rod shaped extension to its end surface adjacent said first plate member, and said means for fastening included: a central opening in said first metal plate; and a bolt extending through said central opening and threadly engaged in said axial bore so as to fasten said first and second plate members together with said first plate member abutting said end surface of said rod shaped extension.

3. A plug as defined in claim 2 wherein: said cylindrical member further includes inwardly directed top and bottom portions which extend along the inner surface of said second and first plate members, respectively, and which are each provided with central circular openings; and said means for fastening further includes a groove which is formed in the peripheral surface of said rod-shaped extension adjacent said inner surface of said second plate member and which engages the inner edge of said top portion of said cylindrical member, and an annular groove, which is formed in said end surface of said rod-shaped extension and extends to its peripheral surface, and which engages the inner edge of said bottom portion of said cylindrical member to clamp same against the said inner surface of said first plate member.

4. A plug as defined in claim 2 wherein said valve means is disposed in a portion of said axial bore which is beneath said outer surface of said second metal plate member.

5. A plug as defined in claim 4 wherein said portion of said axial bore includes a first section wherein the bore defining sidewall narrowingly tapers in a direction toward said outer surface of said second plate member so as to provide a second section of reduced diameter relative to that of the section of said axial bore adjacent said transverse bore; and wherein said valve means includes: a plunger disposed in said axial bore so that it is axially moveable along said axial bore, said plunger having a circular cross section with a first portion disposed in said second section of said axial bore, a second portion of increased diameter disposed in said section of said axial bore adjacent said transverse bore, and a tapered transition portion adjacent said tapered first section of said axial bore; a sealing ring disposed in the tapered surface of said plunger in its said transition portion and facing said tapered section of said sidewall; and spring means disposed between the end surface of said bolt and the end surface of said second section of said plunger for urging said plunger in a direction toward said outer surface of said second plate member so as to force said sealing ring against said tapered section of said sidewall to seal said axial bore.

6. A plug as defined in claim 5 wherein said axial bore has a further portion which is disposed between said second section of said axial bore and said outer surface of said second plate member and which has a larger diameter than said second section of said axial bore; and wherein the free end of said first portion of said plunger extends into said further portion of said axial bore.

7. A plug as defined in claim 6 wherein said means for releasably coupling includes said further portion of said axial bore which is shaped so as to receive the end of an insertion tool and form the female member of a twist locking type coupling arrangement.

8. A plug as defined in claim 1 wherein said means for releaseably coupling includes the portion of said axial bore adjacent said outer surface of said second plate member, said portion of said axial bore being shaped so as to comprise the female member of a twist locking type coupling arrangement.

9. A plug as defined in claim 8 wherein said portion of said axial bore includes a first section of constant diameter extending from said outer surface of said second plate member, a following second section of a substantially larger constant diameter, and a slot formed in said outer surface of said second plate member and extending to said following second section, with the edges of said slot being defined by two parallel chords of the circle defining the periphery of said following second section, which chords are simultaneously chords of the circle defining the periphery of said first section of constant diameter.

10. A plug as defined in claim 1 wherein said metal members are made of stainless steel and said elastomer is an ethylene propylene diene monomer material.

11. A plug as defined in claim 1 wherein said diameter of said second plate member is larger than that of said first plate member and is sufficiently large so as to cover the hole to be plugged.

12. A plug as defined in claim 11 wherein said diameter of said second plate member is sufficiently small so that said second plate member can pass through the bore hole in the flange of a reactor vessel head.

13. A plug as defined in claim 11 wherein the peripheral surface of said cylindrical member has a slight outward taper adjacent said second plate member.

14. A method of sealing one of the blind bore holes located in the reactor vessel body flange of a nuclear reactor, and which normally are used to fasten the reactor vessel head to the reactor vessel body by means of bolts passing through corresponding bores in a mating flange on the reactor vessel head, prior to the flooding of the reactor vessel and subsequent removal of the reactor vessel head for the purpose of refueling the reactor, said method comprising the steps of:

providing an elongated insertion tool of a length sufficient of extend through a bore hole in the flange of the reactor vessel head and into the underlying blind bore;

providing an expandable inflatable circular plug including first and second spaced substantially parallel circular metal plate members with at least the first plate member having a diameter slightly smaller than that of a bore hole to be plugged, a cylindrical member, which is formed of an elastomer material and which has a diameter which is normally substantially the same as that of said first plate member, disposed substantially symmetrically between and sealingly fastened to said first and second plate members so as to define a radially expandable pressure chamber within said cylindrical member, an axial bore extending from the outer surface of said second plate member, and opening into said annular pressure chamber, a normally closed valve means disposed in said axial bore for sealing said axial bore when in a closed position and for permitting air to enter or leave said chamber via said axial bore when in an open position, and means disposed adjacent said outer surface of said second plate member for releasably attaching said second plate member, and hence said plug to a tool;

releasably attaching said expandable inflatable circular plug to one end of said insertion tool;

by means of said insertion tool, passing the plug through a bore hole in the vessel head flange and positioning the plug in the upper portion of the underlying blind bore hole;

opening the valve means in the plug by means of the tool;

passing air under pressure through the tool and into the chamber of the plug to expand the wall of said cylindrical member until it sealingly contacts the adjacent wall of said blind bore; and thereafter, closing the valve means, releasing the plug from the tool, and withdrawing the tool from the bore hole in the flange of the vessel head.

15. A method as defined in claim 14 wherein said step of passing air under pressure includes increasing the pressure in said chamber until a predetermined pressure is reached.

* * * * *